(12) United States Patent
Xiao et al.

(10) Patent No.: US 11,245,763 B2
(45) Date of Patent: Feb. 8, 2022

(54) DATA PROCESSING METHOD, COMPUTER DEVICE AND STORAGE MEDIUM

(71) Applicant: Tencent Technology (Shenzhen) Company Limited, Shenzhen (CN)

(72) Inventors: Zedong Xiao, Shenzhen (CN); Yuanli Zheng, Shenzhen (CN); Zonghao Chen, Shenzhen (CN); Zhaopeng Gu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 335 days.

(21) Appl. No.: 16/599,004

(22) Filed: Oct. 10, 2019

(65) Prior Publication Data

US 2020/0045113 A1    Feb. 6, 2020

Related U.S. Application Data

(63) Continuation of application No. PCT/CN2018/111691, filed on Oct. 24, 2018.

(30) Foreign Application Priority Data

Oct. 25, 2017   (CN) .......................... 201711008770.0

(51) Int. Cl.
   *H04L 29/08*         (2006.01)
   *G06K 9/62*          (2006.01)
(52) U.S. Cl.
   CPC ............ *H04L 67/12* (2013.01); *G06K 9/6288* (2013.01)
(58) Field of Classification Search
   CPC .............................. H04L 67/12; G06K 9/6288
   See application file for complete search history.

(56) References Cited

U.S. PATENT DOCUMENTS

| 6,222,848 B1 * | 4/2001 | Hayward | ................ | H04J 3/085 |
| | | | | 370/222 |
| 7,522,629 B2 * | 4/2009 | Cao | ................... | H04W 72/1263 |
| | | | | 370/278 |

(Continued)

FOREIGN PATENT DOCUMENTS

| CN | 102957869 A | 3/2013 |
| CN | 103139446 A | 6/2013 |
| CN | 103686042 A | 3/2014 |

OTHER PUBLICATIONS

Tencent Technology, ISRWO, PCT/CN2018/111691, Jan. 30, 2019, 5 pgs.

(Continued)

*Primary Examiner* — Chandrahas B Patel
(74) *Attorney, Agent, or Firm* — Morgan, Lewis & Bockius LLP

(57) ABSTRACT

A data processing method is performed at a terminal. The method includes: generating a supplementary signal frame according to a first original signal frame of a first data collector when a first frame rate of the first data collector in a terminal is less than a second frame rate of a second data collector, and determining an input time stamp of the supplementary signal frame according to the second frame rate; inputting the supplementary signal frame into a first input queue of the first data collector when a current time reaches the input time stamp of the supplementary signal frame; obtaining a second original signal frame that is currently input into a second input queue and that is of the second data collector; and performing signal fusion on the supplementary signal frame in the first input queue and a second original signal frame in the second input queue.

20 Claims, 10 Drawing Sheets

(56) References Cited

U.S. PATENT DOCUMENTS

| | | | | |
|---|---|---|---|---|
| 8,014,288 B1* | 9/2011 | MacAdam | ............. | H04L 49/65 |
| | | | | 370/235.1 |
| 8,879,464 B2* | 11/2014 | Michaelis | ................. | H04L 1/22 |
| | | | | 370/316 |
| 2007/0153731 A1* | 7/2007 | Fine | ....................... | H04B 17/24 |
| | | | | 370/329 |
| 2010/0265929 A1* | 10/2010 | Liao | ..................... | H04L 1/0009 |
| | | | | 370/338 |
| 2016/0323565 A1 | 11/2016 | van Baarsen et al. | | |

OTHER PUBLICATIONS

Tencent Technology, IPRP, PCT/CN2018/111691, Apr. 28, 2020, 4 pgs.

* cited by examiner

DATA PROCESSING METHOD, COMPUTER DEVICE AND STORAGE MEDIUM

CROSS-REFERENCE TO RELATED APPLICATIONS

This application is a continuation application of PCT/CN2018/111691, entitled "DATA PROCESSING METHOD, COMPUTER DEVICE, AND STORAGE MEDIUM" filed on Oct. 24, 2018, which claims priority to Chinese Patent Application No. 201711008770.0, entitled "DATA PROCESSING METHOD AND APPARATUS" filed with the Patent Office of China on Oct. 25, 2017, both of which are incorporated by reference in their entirety.

FIELD OF THE TECHNOLOGY

This application relates to the field of Internet technologies, and in particular, to a data processing method, a computer device, and a storage medium.

BACKGROUND OF THE DISCLOSURE

With the rapid development of science and technology, a variety of sensing devices (such as accelerometers, gyroscopes, visual image sensors, inertial sensors, and radars) have been derived. These sensors may be integrated and applied to a variety of mobile devices (for example, intelligent robots, virtual reality and augmented reality devices) to provide positioning and navigation functions. For example, in a process of robot positioning and navigation, location information of the robot may be estimated through signal fusion between the sense signals collected by the sensors such as the gyroscope and the radar.

At present, various types of sensors output these discrete sense signals according to a frame rate (for example, a frame rate at which the image sensor outputs a sense signal is 30 Hz; a frame rate at which the inertial sensor outputs a sense signal is usually greater than 100 Hz, for example, 500 Hz). Therefore, these sense signals (that is, inertial sensor signals and image sensor signals) may be input into the signal processor for sensor signal fusion.

To output a relatively high frame rate, a sensor frame rate output with a high frame rate is often considered. However, because an output frame rate of an image sensor of a low frame rate is less than an output frame rate of an inertial sensor of a high frame rate, within an input interval time length of any two image sensor signals of the image sensor of a low frame rate, there may be a plurality of inertial sensor signals of an inertial sensor of a high frame rate. Therefore, in a process of performing signal fusion in the input interval time length, a low frame rate sense signal for correcting the high frame rate sense signal input is lacked, and thus an accurate estimator cannot be obtained, resulting in that estimated location information seriously deviates from the true value.

SUMMARY

According to various embodiments provided in this application, a data processing method, a computer device (e.g., a terminal), and a storage medium are provided.

A first aspect of the present applications provides a data processing method performed at a terminal having one or more processors and memory storing programs to be executed by the one or more processors, the method comprising:

generating, by the terminal, a supplementary signal frame according to a first original signal of a first data collector in a case that a first frame rate of the first data collector in the terminal is less than a second frame rate of a second data collector;

determining, by the terminal, an input time stamp of the supplementary signal frame according to the second frame rate;

inputting, by the terminal, the supplementary signal frame into a first input queue of the first data collector in a case that a current time reaches the input time stamp of the supplementary signal frame;

obtaining, by the terminal, a second original signal frame that is currently input into a second input queue and that is of the second data collector; and performing, by the terminal, signal fusion on the supplementary signal frame in the first input queue and the second original signal frame currently input into the second input queue.

The generating, by a terminal, a supplementary signal frame according to a first original signal of a first data collector includes:

extracting a target first original signal frame corresponding to the first data collector from the first input queue of the first data collector, and generating a supplementary signal frame corresponding to the first input queue according to the target first original signal frame, a value of the supplementary signal frame being the same as a value of the target first original signal frame in a case that the target first original signal frame is the first original signal frame having a highest input time stamp in the first input queue.

The generating, by a terminal, a supplementary signal frame according to a first original signal of a first data collector includes:

extracting, by the terminal, input time stamps of a historical first original signal frame and a target first original signal frame from the first input queue of the first data collector, and extracting an input time stamp of a target second original signal frame from the second input queue of the second data collector, the target second original signal frame being a second original signal frame having a highest input time stamp in the second input queue in a case that the target first original signal frame is a first original signal frame having a highest input time stamp in the first input queue;

estimating, by the terminal, a first supplementary frame parameter according to the historical first original signal frame;

determining, by the terminal, an input interval time length of the second data collector according to the second frame rate, and calculating a supplementary frame interval time length corresponding to the first supplementary frame parameter according to the input time stamp of the target first original signal frame, the input time stamp of the target second original signal frame, and the input interval time length; and generating, by the terminal, the supplementary signal frame according to the target first original signal frame, the first supplementary frame parameter, and the supplementary frame interval time length.

The generating, by a terminal, a supplementary signal frame according to a first original signal of a first data collector includes:

extracting, by the terminal, an input time stamp of a target first original signal frame from the first input queue of the first data collector, and extracting an input time stamp of a target second original signal frame from the second input queue of the second data collector, the target second original signal frame being a second original signal frame having a highest input time stamp in the second input queue in a case that the target first original signal frame is a first original signal frame having a highest input time stamp in the first input queue;

obtaining, by the terminal, a second supplementary frame parameter;

determining, by the terminal, an input interval time length of the second data collector according to the second frame rate, and calculating a supplementary frame interval time length corresponding to the first supplementary frame parameter according to the input time stamp of the target first original signal frame, the input time stamp of the target second original signal frame, and the input interval time length; and generating, by the terminal, the supplementary signal frame according to the target first original signal frame, the first supplementary frame parameter, and the supplementary frame interval time length.

The determining, by the terminal, an input time stamp of the supplementary signal frame according to the second frame rate includes:

calculating, by the terminal according to the second frame rate, an input time stamp of a second original signal frame to be input into the second input queue as the input time stamp of the supplementary signal frame.

The determining, by the terminal, an input time stamp of the supplementary signal frame according to the second frame rate includes:

determining, by the terminal, the input time stamp of the supplementary signal frame according to the input time stamp of the target first original signal frame and the supplementary frame interval time length.

Before the generating, by a terminal, a supplementary signal frame according to a first original signal of a first data collector in a case that a first frame rate of the first data collector is less than a second frame rate of a second data collector, and determining an input time stamp of the supplementary signal frame according to the second frame rate, the method further includes:

obtaining, by the terminal, a target first original signal frame in the first input queue and a target second original signal frame from the second input queue, the target second original signal frame being a second original signal frame having a highest input time stamp in the second input queue in a case that the target first original signal frame is a first original signal frame having a highest input time stamp in the first input queue; and performing, by the terminal, signal fusion on the target first original signal frame in the first data collector and the target second original signal frame in the second data collector in a case that the current time reaches the input time stamp of the target first original signal frame in a case that the input time stamp of the target second original signal frame is less than the input time stamp of the target first original signal frame.

The method further includes:

using, by the terminal, the supplementary signal frame in the first input queue as the target first original signal frame of the first data collector, and generating a target supplementary signal frame according to the target first original signal frame; and performing, by the terminal, signal fusion on the target supplementary signal frame in the first input queue and the target second original signal frame in the second input queue in a case that the current time reaches the input time stamp of the target supplementary signal frame.

A second aspect of the present applications provides a terminal, including one or more processors, memory coupled to the one or more processors and a plurality of programs stored in the memory that, when executed by the one or more processors, cause the terminal to perform the aforementioned data processing method.

A third aspect of the present applications provides non-transitory computer readable storage medium storing a plurality of machine readable instructions in connection with a terminal having one or more processors, wherein the plurality of machine readable instructions, when executed by the one or more processors, cause the terminal to perform the aforementioned data processing method.

BRIEF DESCRIPTION OF THE DRAWINGS

To describe the technical solutions in the embodiments of this application or in the existing technology more clearly, the following briefly introduces the accompanying drawings for describing the embodiments or the existing technology. Apparently, the accompanying drawings in the following description show merely some embodiments of this application, and a person of ordinary skill in the art may still derive other drawings from the accompanying drawings without creative efforts.

DESCRIPTION OF EMBODIMENTS

To make the objectives, the technical solutions, and the advantages of this application clearer, the following further describes this application in detail with reference to the accompanying drawings and the embodiments. It should be understood that the specific embodiments described herein are only used to describe this application, instead of limiting this application.

The following clearly and completely describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application without creative efforts shall fall within the protection scope of this application.

Figure 1:
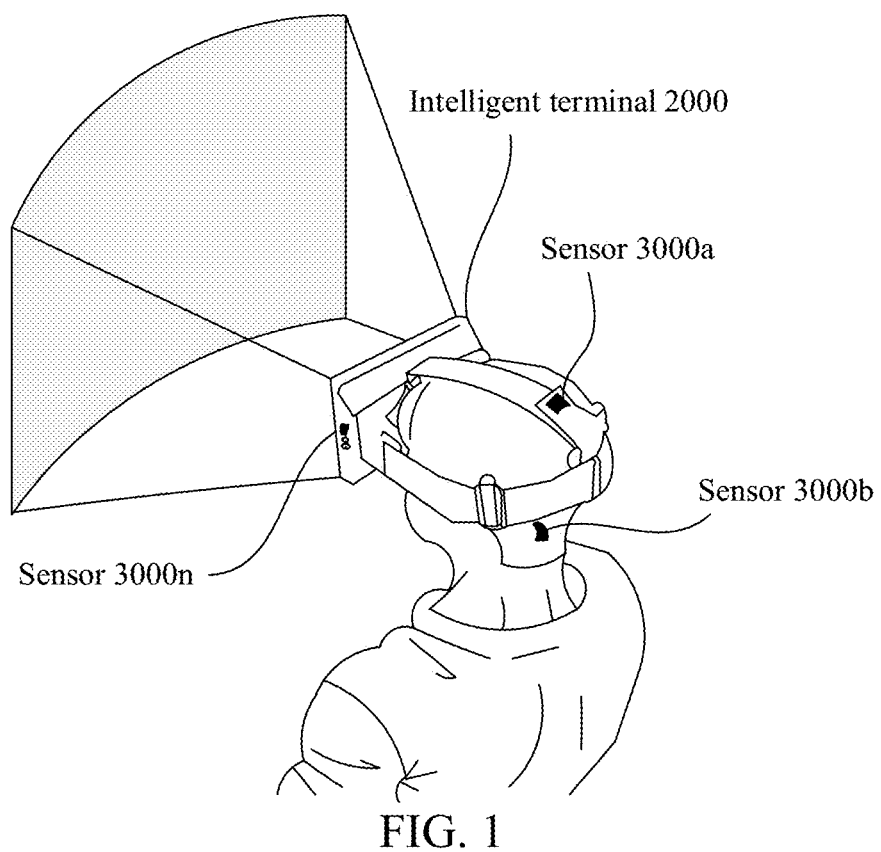
FIG. 1 is a schematic structural diagram of a network architecture according to an embodiment of this application.

FIG. 1 is a schematic structural diagram of a network architecture according to an embodiment of this application. As shown in FIG. 1, the network architecture may include an intelligent terminal 2000 and a data collector cluster. The data collector cluster may include a plurality of sensors. As shown in FIG. 1, a sensor 3000a, a sensor 3000b, . . . , and a sensor 3000n are specifically included.

The sensor 3000a, the sensor 3000b, . . . and the sensor 3000n may separately establish a network connection to the intelligent terminal 2000. The sensors (for example, the sensor 3000a, the sensor 3000d, the sensor 3000e, . . . , and the sensor 3000n) may be integrated in the intelligent terminal. Optionally, the sensors (for example, the sensor 3000b and the sensor 3000c) may also be attached to the intelligent terminal as independent collection devices.

As shown in FIG. 1, the intelligent terminal 2000 may be configured to: receive sense signals collected by sensors, and parse the sense signals, to obtain input time stamps respectively corresponding to original signal frames of the sensors. Each sense signal is a discrete time signal, and the sensors respectively output the discrete time signals according to a frame rate. Therefore, the intelligent terminal may receive, at different input time stamps, sense signals input by the sensors, and generate a supplementary signal frame based on an input signal (namely, the first original signal frame) of a sensor of a low frame rate, to perform supplementary input on the input signal of the sensor of a low frame rate, and performs signal fusion on the supplementary signal frame and an input signal of a high frame rate sensor (namely, a target second original signal frame, where the target second original signal frame is a second original signal frame having a highest input time stamp in the second input queue) when current time reaches the input time stamp of the supplementary signal frame, to ensure that the measurement accuracy can be improved when a high frame rate estimator is outputted, thereby obtaining accurate location information.

For example, if the intelligent terminal 2000 is a virtual reality (VR) helmet, the VR helmet may establish a network connection to a plurality of sensors (for example, the sensor 3000a, the sensor 3000b, and the sensor 3000c shown in FIG. 1) at the same time. An output frame rate (namely, the first frame rate) of the sensor 3000a is a Hz, an output frame rate (namely, the second frame rate) of the sensor 3000b is b Hz, an output frame rate (namely, the third frame rate) of the sensor 3000c is c Hz, and a size relationship of the three output frame rates satisfies: the first frame rate is less than the second frame rate, and the second frame rate is less than the third frame rate; namely, the sensor 3000c is a sensor of a highest frame rate, the sensor 3000b is a sensor of a relatively low frame rate, and the sensor 3000a is a sensor of a lowest frame rate. Therefore, before signal fusion is performed on input signals (supplementary signal frames) of the other two sensors (3000a and 3000b) and the input signal of the sensor (3000c) of a highest frame rate (a target third original signal frame, where the target third original signal frame is a third original signal frame having a highest input time stamp in the third input queue), supplementary frame processing needs to be separately performed on the input signals of the sensors 3000a and 3000b in advance, to obtain a supplementary signal frame A to be input into a first input queue of the sensor 3000a, and obtain a supplementary signal frame B to be input into a second input queue of the sensor 3000b. Next, the VR helmet may further perform synchronous fusion on the supplementary signal frame A, the supplementary signal frame B, and the target third original signal frame when current time reaches the input time stamp of the target third original signal frame, to ensure that the measurement accuracy of the VR helmet can be improved when a high frame rate estimator is outputted, thereby obtaining accurate location information.

Reference made be made to the following embodiments corresponding to FIG. 2 to FIG. 7 for a specific process in which the intelligent terminal 2000 generates the supplementary signal frame and of signal fusion.

Figure 1A:
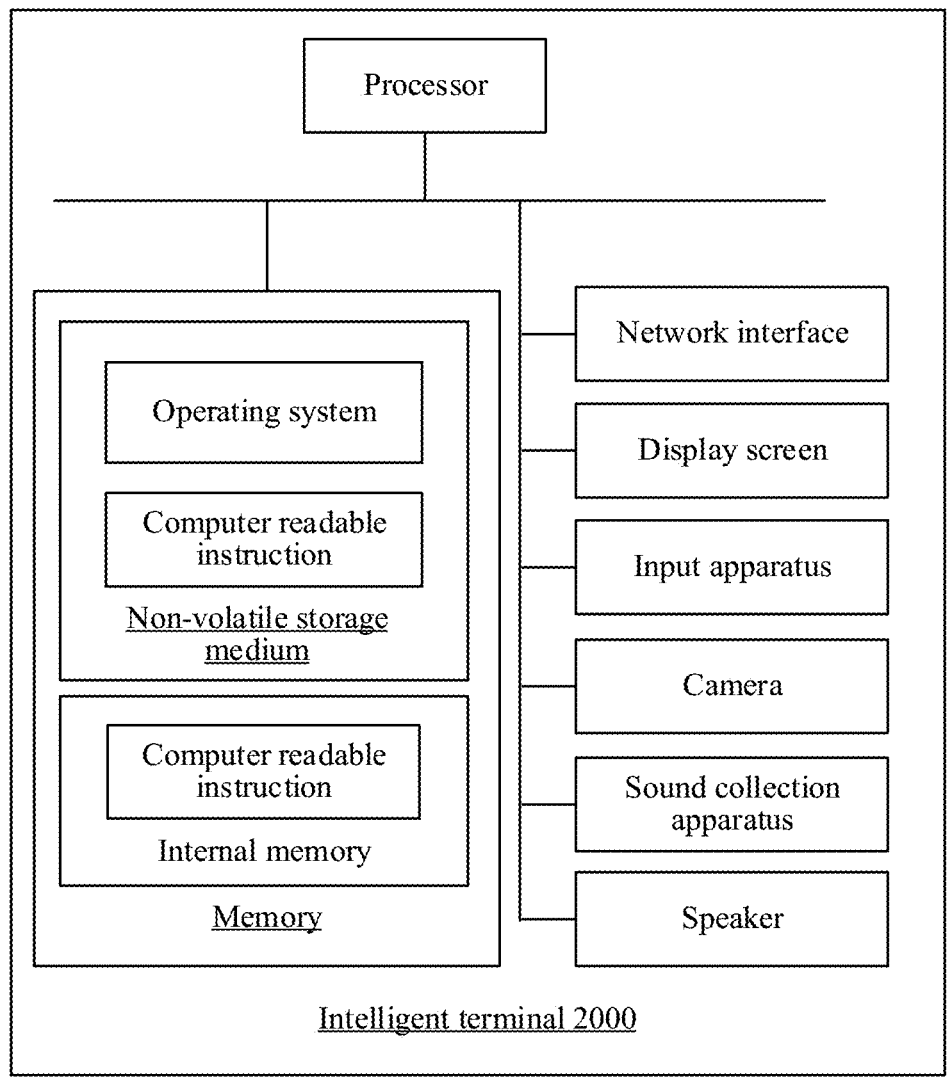
FIG. 1a is a diagram of an internal structure of an intelligent terminal according to an embodiment of this application.

In an embodiment, FIG. 1a provides a diagram of an internal structure of an intelligent terminal. The intelligent terminal includes a processor, a memory, a network interface, an input apparatus, and a display that are connected via a system bus. The memory includes a non-volatile storage medium and an internal memory. The non-volatile storage medium of the computer device stores an operating system, and may further store a computer-readable instruction. When the computer-readable instruction is executed by the processor, the processor may be caused to perform the data processing method. The internal memory may also store a computer-readable instruction, and when the computer-readable instruction is executed by the processor, the processor may be caused to perform the data processing method. The display of the computer device may be a liquid crystal display or an e-ink display. The input apparatus of the computer device may be a touch layer covering the display, or may be a button, a trackball, or a touchpad disposed on a housing of the computer device, or may be an external keyboard, touchpad, a mouse or the like. A person skilled in the art may understand that, in the structure shown in FIG. 1a, only a block diagram of a partial structure related to a solution in this application is shown, and does not constitute a limit to the intelligent terminal to which the solution in this application is applied. Specifically, the intelligent terminal may include more components or fewer components than those shown in the figure, or some components may be combined, or a different component deployment may be used.

Figure 2:
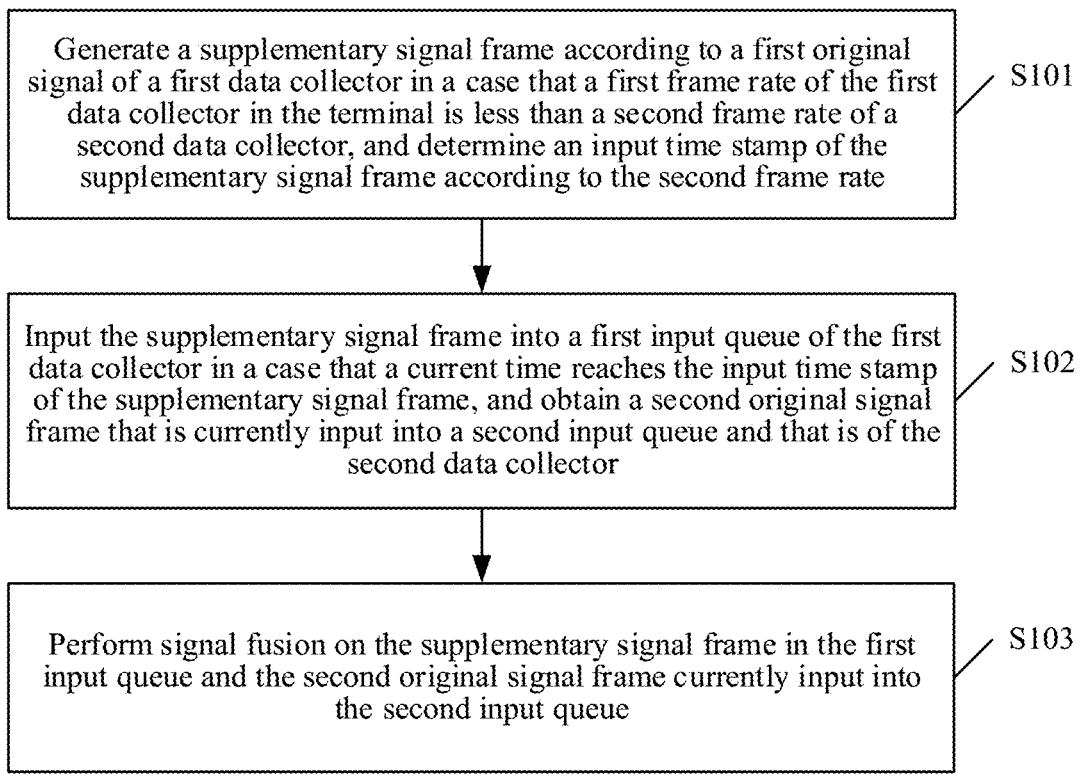
FIG. 2 is a schematic flowchart of a data processing method according to an embodiment of this application.

Further, FIG. 2 is a schematic flowchart of a data processing method according to an embodiment of this application. As shown in FIG. 2, the method may include the following steps.

Step S101: Generate a supplementary signal frame according to a first original signal of a first data collector in a case that a first frame rate of the first data collector in the terminal is less than a second frame rate of a second data collector, and determine an input time stamp of the supplementary signal frame according to the second frame rate.

Specifically, if detecting that the first frame rate of the first data collector is less than the second frame rate of the second data collector, the data processing apparatus may further generate the supplementary signal frame according to a target first original signal frame of the first data collector. A value of the supplementary signal frame may be the same as a value of the target first original signal frame. Namely, the target first original signal frame may be a first original signal frame having a highest input time stamp in a first input queue. In other words, the target first original signal frame may be a first original signal frame most recently input into the data processing apparatus. Optionally, the data processing apparatus may further generate a supplementary signal frame according to a historical first original signal frame and the target first original signal frame of the first data collector. Optionally, the data processing apparatus may further generate a supplementary signal frame according to a signal additionally input from the outside and the target first original signal frame. Next, the data processing apparatus may further determine the input time stamp of the supplementary signal frame according to the second frame rate.

It is to be understood that in the process of generating the supplementary signal frame, the first original signal frame may include the historical first original signal frame and the target first original signal frame. The target first original signal frame may be a first original signal frame having a highest input time stamp in the first input queue, namely, the first original signal frame most recently input into the first input queue. The historical first original signal frame may be a sense signal that is collected by the first data collector (for example, the sensor 3000a in the embodiment corresponding to FIG. 1) and that has been input into the first input queue. Optionally, the historical first original signal frame may also be a supplementary signal frame that has been input into the first input queue for performing supplementary input on the input signal of the first data collector.

The data processing apparatus may be integrated and applied to any intelligent terminal (for example, the intelligent terminal 2000 in the embodiment corresponding to FIG. 1). In addition, the intelligent terminal may include: a smartphone, a tablet computer, a desktop computer, a smart TV, VR glasses, VR gloves, a VR helmet, an augmented reality (AR) device (for example, AR glasses) or an artificial intelligence robot. In addition, the intelligent terminal may include a user operation interface, such as a keyboard, a mouse, a joystick, a touch screen, or a display, so that any suitable user input may interact with the intelligent terminal, for example, may control the intelligent terminal by using a manual input command, sound control, gesture, azimuth, or the like.

In addition, the intelligent terminal may be connected to a plurality of data collectors (for example, the plurality of sensors in the embodiment corresponding to FIG. 1). The sensors may be integrated into the intelligent terminal, or independently exist as independent display devices. Namely, the sensing devices may be permanently or removably attached to the intelligent terminal. The sensing devices may include but are not limited to: a global positioning system (GPS) sensor, an inertial sensor, a pose sensor, a proximity sensor, or a visual image sensor. Therefore, the intelligent terminal may receive sense signals collected by the sensors (for example, a GPS sensor and a pose sensor) (namely, the first original signal frame collected by the first data collector and the second original signal frame collected by the second data collector may be received), and analyze the sense signals, to obtain input time stamps respectively corresponding to original signal frames of the sensors. The input time stamp refers to a relative time stamp counted since timing during system startup. The sense signals are all discrete time signals, and the sensors respectively output the discrete time signals according to a frame rate. Therefore, the intelligent terminal may receive inputs of different discrete time signals at different input time stamps. For example, the first original signal frame input by the first data collector may be received when the input time stamp is 50 ms, and the second original signal frame input by the second data collector is received when the input time stamp is 48 ms. The first original signal frame and the second original signal frame may be discrete time signals that describe one or more of an azimuth, a direction, a speed, or an acceleration of the intelligent terminal.

When the output frame rate (namely, the first frame rate) of the first data collector is less than the output frame rate (namely, the second frame rate) of the second data collector, the data processing apparatus applied to the intelligent terminal may perform supplementary frame processing on the first data collector. Namely, the data processing apparatus may perform supplementary input on the sense signal input by the first data collector. Namely, the data processing apparatus may generate a supplementary signal frame of the first data sensor (namely, the supplementary signal frame may be used for signal fusion with a next sense signal of the second data collector) based on the sense signal most recently input by the first data sensor (namely, a sense signal having a highest input time stamp). Therefore, in a process of generating the supplementary signal frame (a new sense signal), a supplementary signal frame may be generated by repeatedly using the first original signal frame (namely, the target first original signal frame in the input queue of the first data collector, where the target first original signal frame is a first original signal frame having a highest input time stamp in the input queue) most recently input by the first data collector (the sensor of a low frame rate), to perform supplementary input on the input signal of the sensor of a low frame rate in time and effectively, thereby ensuring that the output time of the sensor of a low frame rate can align with the output time of the sensor of a high frame rate.

To facilitate better understanding of this solution, in this embodiment of this application, an example in which the intelligent terminal is connected to two data collectors is only used. Namely, the data processing apparatus in the intelligent terminal may be configured to receive the first original signal frame input by the first data collector and the second original signal frame input by the second data collector. The first data collector may be a sensor of a low frame rate (for example, a visual image sensor of an output frame rate of 30 Hz), and the second data collector may be a sensor of a high frame rate (for example, an inertia sensor of an output frame rate of 250 Hz), so that the data processing apparatus may further perform step S101 to step S103, to make the output time of the sensor of a low frame rate align with the output time of the sensor of a high frame rate, to obtain a more accurate fusion estimator, thereby obtaining current accurate azimuth and/or motion information of the intelligent terminal. Certainly, when three or more data collectors having different frame rates synchronously input sense signals into the intelligent terminal, the intelligent terminal may still repeatedly use the original signal frame most recently input by the sensor of a low frame rate (namely, the first original signal frame having a highest input time stamp in the first input queue can be repeatedly used), to generate a supplementary signal frame corresponding to the sensor of a highest frame rate, so that output time of each sensor may be synchronized, to facilitate signal fusion with the sensor of a highest frame rate.

Step S102: Input the supplementary signal frame into a first input queue of the first data collector in a case that a current time reaches the input time stamp of the supplementary signal frame, and obtain a second original signal frame that is currently input into a second input queue and that is of the second data collector.

The first input queue is used to store each discrete time signal (namely, the historical first original signal frame) collected by the first data collector and the to-be-input supplementary signal frame. If the data processing apparatus detects that the current time reaches the input time stamp of the supplementary signal frame, the data processing apparatus inputs the to-be-input supplementary signal frame into the first input queue of the first data collector. In the first input queue, the signal frames correspond to different input time stamps.

The second input queue is used to store the historical second original signal frame that has been input into the data processing apparatus and the second original signal frame to be input into the data processing apparatus. If the current time reaches the input time stamp of the supplementary signal frame (namely, the input time stamp of the second original signal frame), the second data collector may input the to-be-input second original signal into the second input queue.

Therefore, when obtaining the supplementary signal frame currently input by the first data collector, the data processing apparatus may further synchronously obtain the second original signal frame currently input by the second data collector, to ensure that when the current time reaches the input time stamp of the second original signal frame, there is a supplementary signal frame matching the second original signal frame, so that the data processing apparatus may further perform step S103.

The data processing apparatus may use the specific generation process in any of the three cases for generating the supplementary signal frame that are described in step S101 and the specific input process of inputting the supplementary signal frame into the first input queue as a supplementary frame processing process. Therefore, through the supplementary frame processing process, the data processing apparatus can further perform step S103 when ensuring that the output time of the sensor of a low frame rate aligns with the output time of the sensor of a high frame rate, to accurately output a signal fusion estimation value of a relatively high frame rate. Step S103: Perform signal fusion on the supplementary signal frame in the first input queue and the second original signal frame currently input into the second input queue.

Specifically, after performing step S102, the data processing apparatus may further perform signal fusion on a supplementary signal frame and a second original signal frame that have a same input time stamp, so that a fusion output frame rate reaches an output frame rate of the sensor of a high frame rate, and a signal fusion estimation value (namely, the estimator after fusion) of a relatively high frame rate can be accurately outputted. The estimator may be used to estimate current location information of the intelligent terminal (for example, an artificial intelligence robot). Namely, the data processing apparatus may perform signal fusion on the second original signal frame that is most recently received and the supplementary signal frame that is most recently received, to obtain an estimator for describing an azimuth and/or motion information of the intelligent terminal.

Figure 3:
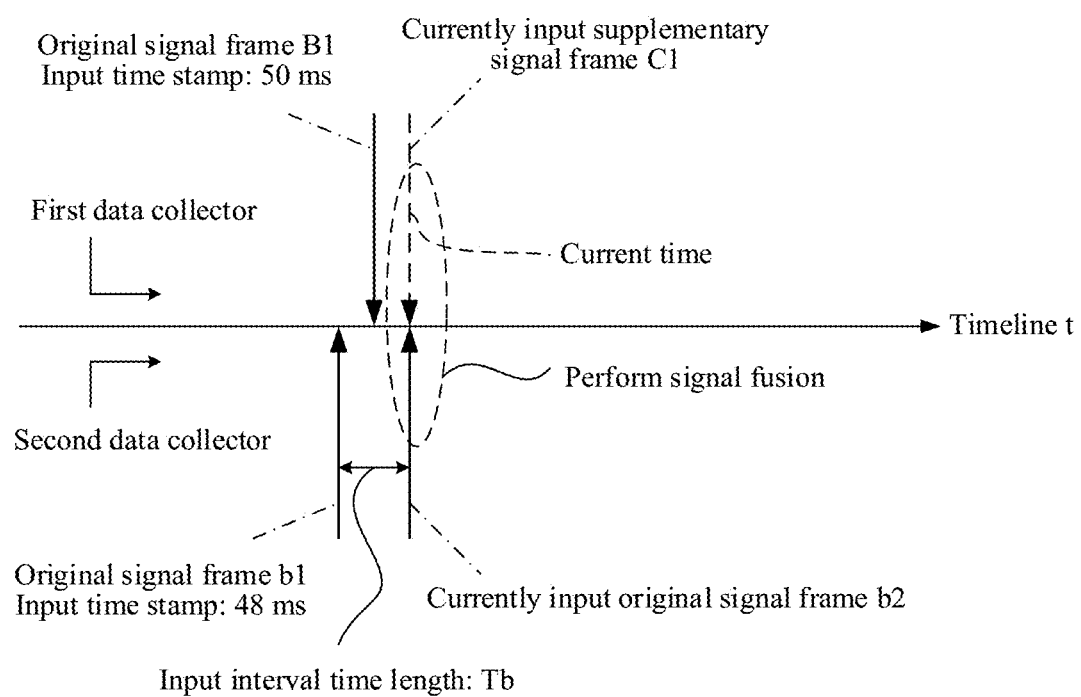
FIG. 3 is a schematic diagram of a fused signal frame according to an embodiment of this application.

Further, FIG. 3 is a schematic diagram of a fused signal frame according to an embodiment of this application. As shown in FIG. 3, the intelligent terminal is a robot A, and two data collectors connected to the robot A are respectively a first data collector and a second data collector. The first data collector may be a visual image sensor. A first frame rate (namely, an output frame rate) of the visual image sensor is Fa Hz (Fa=1/Ta, where Ta is an input interval time length between any two image signals collected by the visual image sensor), and the visual image sensor may be configured to: collect an image signal in real time, and sequentially input collected image signals into a first output queue at an input interval time length Ta. Therefore, an original signal frame B1 with an input time stamp of 50 ms shown in FIG. 3 may exist in the first input queue. The original signal frame B1 is a target first original signal frame in the first input queue, and may receive, after an input interval time length (for example, Ta=33 ms), a next first original signal frame collected by the visual image sensor.

As shown in FIG. 3, the second data collector may be an inertia sensor, and the inertia sensor may include: a linear accelerometer and/or an angular rate gyroscope, mainly configured to detect and measure six degrees of freedom pose signals of the robot A, and an output frame rate (namely, a second frame rate) of the inertia sensor is Fb Hz (Fb=1/Tb, where Tb is an input interval time length between any two six degrees of freedom pose signals collected by the inertia sensor). Therefore, the inertia sensor may separately input the collected six degrees of freedom pose signals into the data processing apparatus of the robot A every other input interval time length (Tb) (for example, the inertia sensor may input the collected second original signal frames into the data processing apparatus every other input interval time length of 4 ms). An original signal frame b1 with an input time stamp of 48 ms shown in FIG. 3 may exist in the second input queue of the inertia sensor. The original signal frame b1 is a target second original signal frame in the second input queue, and an input time stamp 52 ms of the original signal frame b2 to be input into the second input queue may be obtained according to the input time stamp of the original signal frame b1 and an input interval time length (4 ms).

Therefore, to obtain a higher output frame rate after signal fusion is performed on sense signals of the two sensors, namely, to obtain a more accurate estimator, Supplementary frame processing needs to be performed on an input signal of the visual image sensor of a low frame rate, namely, the original signal frame B1 with an input time stamp of 50 ms may be directly repeatedly used, namely, the original signal frame B1 is directly copied, to obtain a supplementary signal frame (namely, the supplementary signal frame C1 shown in FIG. 3) corresponding to the visual image sensor, and when the current time reaches the input time stamp of the original signal frame b2, signal fusion may be performed on the original signal frame b2 currently input into the second input queue and the supplementary signal frame C1 in the first input queue, so that after signal fusion is performed on sense signals of the two sensors, the fusion output frame rate reaches an output frame rate of a sensor of a high frame rate, to further improve the measurement accuracy when ensuring that the estimator of a relatively high frame rate is outputted, thereby estimating more accurate location information.

Optionally, if there are only two sensors, the sensor of a low frame rate may be determined as a first data collector, and the sensor of a high frame rate may be determined as a second data collector, to perform a signal fusion operation on the first data collector and the second data collector in steps S101 to S103.

Optionally, if there are two or more sensors, the sensor of a highest frame rate in all the sensors may be determined as a second data collector, and any other one or more sensors are determined as a first data collector. Each determined first data collector may generate a supplementary signal frame corresponding to the second data collector based on steps S101 and S102, so that step S103 may be understood as: Perform signal fusion on a supplementary signal frame in the first input queue separately corresponding to each first data collector and a second original signal frame currently input into the second input queue. For example, if there are three first data collectors, and supplementary signal frames respectively corresponding to the three first data collectors are A, B, and C, and the second original signal frame currently input into the second input queue is D, fusion processing may be performed on four signals: A, B, C, and D, to output a more accurate estimation value. Therefore, the number of sensors that perform signal fusion is not limited in this embodiment of this application.

Optionally, if there are three or more sensors, a sensor that meets a fusion signal output frame rate requirement and that does not have a highest frame rate in all the sensors may also be determined as a second data collector. For example, if the fusion signal output frame rate requirement is greater than or equal to 90 Hz, and frame rates of three sensors are respectively 30 Hz, 100 Hz, and 300 Hz, a sensor of 100 Hz may be selected as the second data collector. Further, any one or more sensors may also be selected from other sensors whose frame rate is less than the frame rate of the second data collector as the first data collector. Each determined first data collector may generate a supplementary signal frame corresponding to the second data collector based on steps S101 and S102, so that step S103 may be understood as: Perform signal fusion on a supplementary signal frame in the first input queue separately corresponding to each first data collector, the second original signal frame most recently outputted by the second data collector, and the original signal frame most recently outputted by other sensors whose frame rate is greater than the frame rate of the second data collector. For example, if the fusion signal output frame rate requirement is greater than or equal to 150 Hz, and frame rates of four sensors are respectively 30 Hz, 100 Hz, 300 Hz, and 500 Hz, a sensor of 300 Hz may be selected as the second data collector, and sensors corresponding to 30 Hz and 100 Hz are both determined as the first data collector, and the two first data collectors respectively correspond to supplementary signal frames A and B; the newest second original signal frame of the second data collector is C, and the newest original signal frame of the sensor corresponding to 500 Hz is D, and then fusion processing is performed on four signals: A, B, C, and D, to output a more accurate estimation value.

In this embodiment of this application, a supplementary signal frame is generated according to a first original signal of a first data collector in a case that a first frame rate of the first data collector is less than a second frame rate of a second data collector, and an input time stamp of the supplementary signal frame is determined according to the second frame rate; the supplementary signal frame is input into a first input queue of the first data collector in a case that a current time reaches the input time stamp of the supplementary signal frame, and a second original signal frame that is currently input into a second input queue and that is of the second data collector is obtained; and signal fusion is performed on the supplementary signal frame in the first input queue and the second original signal frame currently input into the second input queue. It can be learned from the above that when the current time reaches the input time stamp of the supplementary signal frame, the supplementary signal frame generated based on the first original signal frame may be used as an input signal of the first data collector (namely, the supplementary signal frame obtained after supplementary frame processing is input into the first input queue), so that signal fusion can be performed on the supplementary signal frame and the target input signal of the second data collector (namely, the second original signal frame currently input into the second queue). In addition, based on the second frame rate of the second data collector, it can be ensured that each time the second data collector inputs a target second original signal frame, there is a signal frame (for example, a supplementary signal frame) corresponding thereto for correcting it, to ensure that the measurement precision is further improved while an estimator of a relatively high frame rate is outputted.

Figure 4:
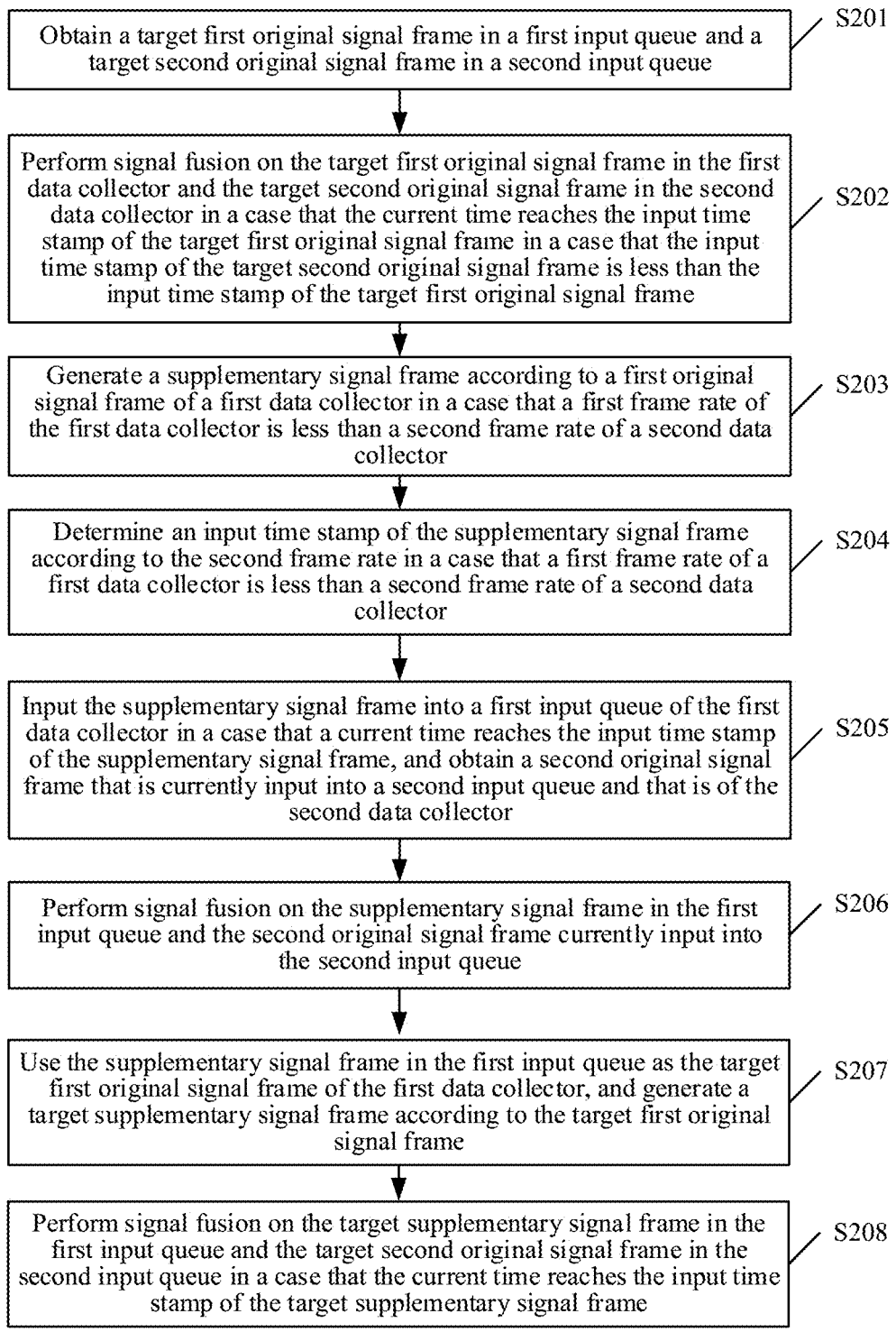
FIG. 4 is a schematic flowchart of another data processing method according to an embodiment of this application.

Further, FIG. 4 is a schematic flowchart of another data processing method according to an embodiment of this application. As shown in FIG. 4, the method may include the following steps.

Step S201: Obtain a target first original signal frame in a first input queue and a target second original signal frame in a second input queue.

In an execution process of step S201, the first input queue is used to store each discrete time signal (namely, the historical first original signal frame) collected by the first data collector and the target first original signal frame (for example, the original signal frame B1 in the embodiment corresponding to FIG. 3). In view of this, the target first original signal frame may be a first original signal frame having a highest input time stamp in the first input queue, namely, the target first original signal frame may be a first original signal frame most recently input into the first input queue.

The second input queue is used to store a historical second original signal frame that has been input into the data processing apparatus and a second original signal frame most recently input into the data processing apparatus (for example, the original signal frame b1 in the embodiment corresponding to FIG. 3). The target second original signal frame is a second original signal frame having a highest input time stamp in the second input queue, namely, the target second original signal frame may be a second original signal frame most recently input into the second input queue.

Step S202: Perform signal fusion on the target first original signal frame in the first data collector and the target second original signal frame in the second data collector in a case that the current time reaches the input time stamp of the target first original signal frame in a case that the input time stamp of the target second original signal frame is less than the input time stamp of the target first original signal frame.

Figure 5:
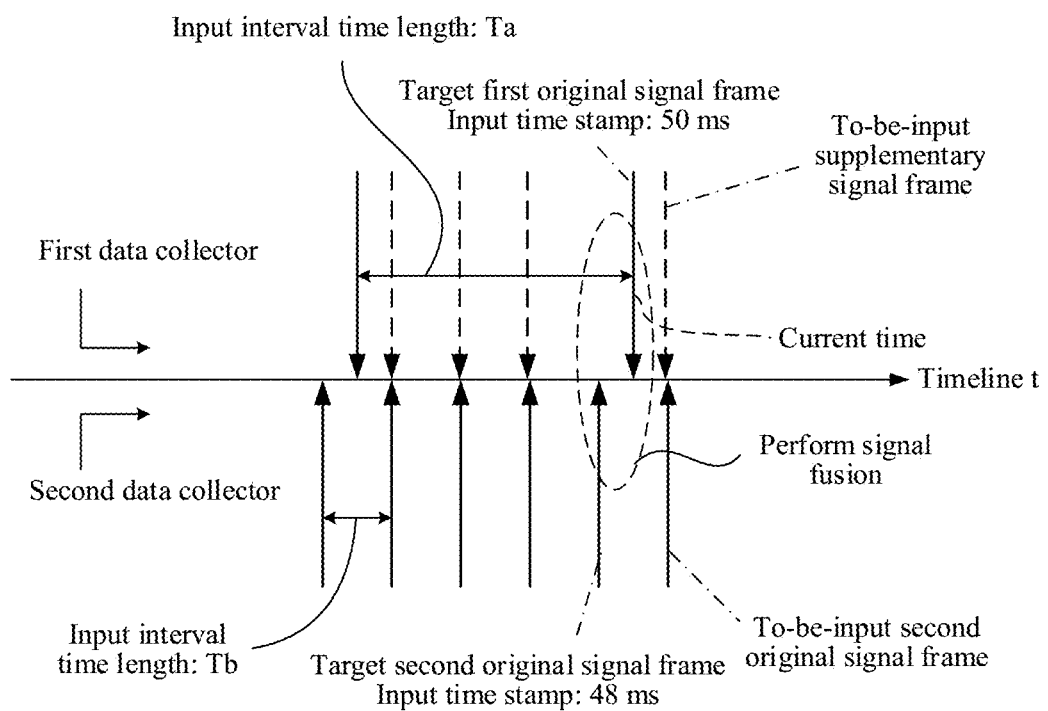
FIG. 5 is a schematic diagram of a fused signal frame according to an embodiment of this application.

Further, FIG. 5 is a schematic diagram of another fused signal frame according to an embodiment of this application. As shown in FIG. 4, the intelligent terminal is a VR helmet, and data collectors connected to the VR helmet are respectively a first data collector and a second data collector. The first data collector is a pose sensor. A first frame rate (namely, an output frame rate) of the pose sensor is a Hz. The pose sensor may be configured to: collect a first six degrees of freedom pose signal (namely, a first original signal frame) in real time, and input collected first original signal frames into the first input queue. Therefore, a VR helmet connected to the pose sensor may obtain a target first original signal frame with an input time stamp of 50 ms shown in FIG. 5 from the first input queue, and use remaining signal frames that have been input into the first input queue before 50 ms (the first original signal frame collected by the pose sensor and the supplementary signal frame that is input as a supplement) as the historical first original signal frame. The second data collector is an inertia sensor. A second frame rate of the inertia sensor is b Hz, and a second frame rate of the inertia sensor is greater than a first frame rate of the pose sensor. The inertia sensor may be configured to: detect and measure a second six degrees of freedom pose signal (namely, a second original signal frame) of a human head, and input collected second original signal frames into a second input queue. The VR helmet connected to the second data collector may obtain a target second original signal frame with an input time stamp of 48 ms shown in FIG. 5 from the second input queue, and use remaining signal frames that have been input into the second input queue before 48 ms (the second original signal frame collected by the inertia sensor) as the historical second original signal frame. In this case, the input time stamp (48 ms) of the target second original signal frame obtained by the VR helmet is less than the input time stamp (50 ms) of the target first original signal frame. Therefore, when detecting that the current time reaches 50 ms, the VR helmet may perform signal fusion on the target first original signal frame in the first input queue and the target second original signal frame in the second input queue, to accurately estimate head pose information of the human head at the current time.

In view of this, the VR helmet may perform frame-to-frame fusion on input signals of the two sensors having different output frame rates, namely, each time the inertia sensor inputs a frame of a second six degrees of freedom pose signal, the pose sensor may correspondingly input a first six degrees of freedom pose signal (namely, the target first original signal frame) having a highest input time stamp in the first input queue into the VR helmet, so that the target first original signal frame input into the VR helmet can be effectively fused with the target second original signal frame. Because two sensors connected to the VR helmet have different output frame rates, input interval time lengths of two paths of original signal frames input into the VR helmet will be different (for example, the inertia sensor may input a second six degrees of freedom pose signal once every 4 ms, and the pose sensor may input a first six degrees of freedom pose signal once every 33 ms). Therefore, when input time stamps of the two paths of original signal frames are different, input time stamps of two paths of original signal frames next input into the VR helmet will be definitely different. Therefore, to enable each second original signal frame input into the VR helmet to have a corresponding first original signal frame on which signal fusion can be performed, The VR helmet may further perform supplementary frame processing on the input signal of the sensor of a low frame rate after performing step S202. Namely, the VR helmet may further perform subsequent steps S203 to S206, to further ensure that the output time of the sensor of the low frame rate may align with the input time of the sensor of the high frame rate (specifically, as shown in FIG. 5, the to-be-input supplementary signal frame and the to-be-input second original signal frame have a same input time stamp), to implement synchronization of input signal frames of the two sensors, to obtain a more accurate estimator, thereby obtaining more accurate head pose information.

Step S203: Generate a supplementary signal frame according to a first original signal frame of a first data collector in a case that a first frame rate of the first data collector is less than a second frame rate of a second data collector.

Figure 6:
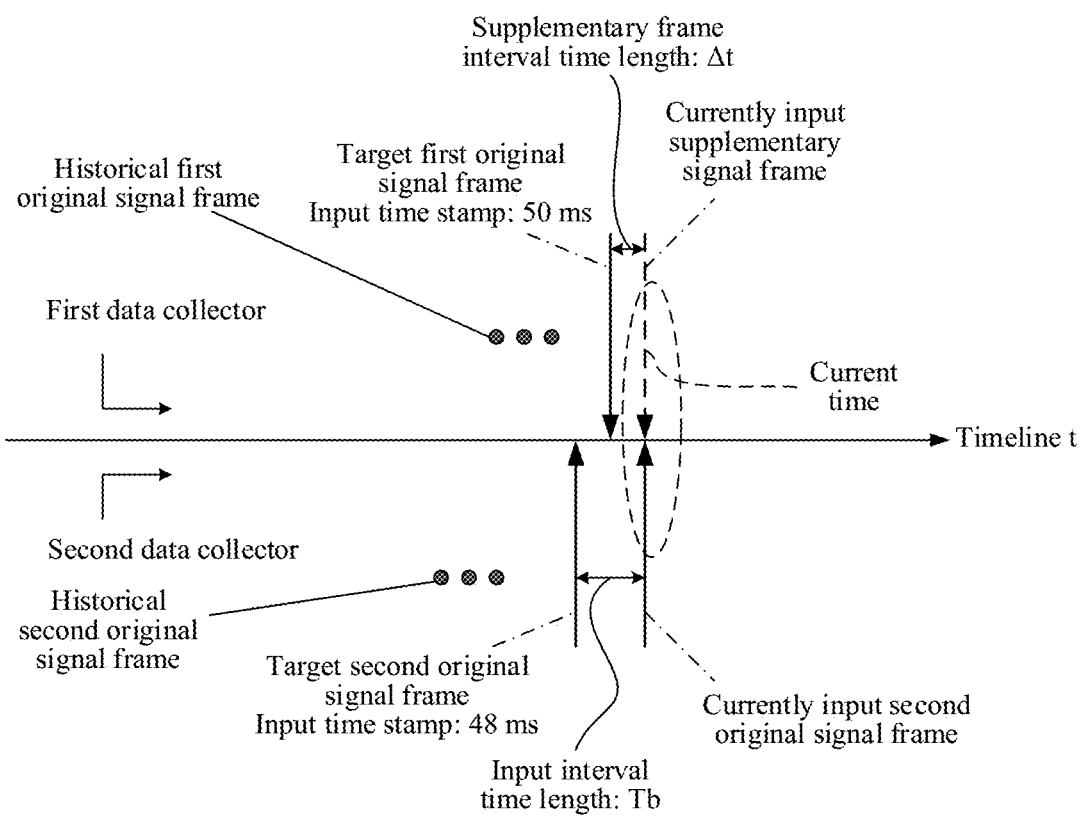
FIG. 6 is a schematic diagram of generating a supplementary signal frame according to an embodiment of this application.

Further, FIG. 6 is a schematic diagram of calculating and generating a supplementary signal frame according to an embodiment of this application. As shown in FIG. 6, the input time stamp of the target first original signal frame in the first input queue of the first data collector is 50 ms, the output frame rate of the first data collector is a Hz, and an input interval time length corresponding to the output frame rate is Ta. As shown in FIG. 6, the input time stamp of the target second original signal frame in the second input queue of the second data collector is 48 ms, the output frame rate of the second data collector is b Hz, and an input interval time length corresponding to the output frame rate is Tb. In this case, because the first frame rate of the first data collector is less than the second frame rate of the second data collector (namely, a Hz is less than b Hz), supplementary frame processing needs to be performed on the input signal of the first data collector, to generate the supplementary signal frame corresponding to the first data collector.

There may be the following there cases of a specific process of generating the supplementary signal frame.

In a first case, a target first original signal frame corresponding to the first data collector is extracted from the first input queue of the first data collector, and a supplementary signal frame corresponding to the first input queue is generated according to the target first original signal frame. The target first original signal frame is a first original signal frame having a highest input time stamp in the first input queue. In this case, a value of the supplementary signal frame is the same as a value of the target first original signal frame. Namely, the data processing apparatus may copy the first original signal frame most recently collected by the first data collector, to obtain a supplementary frame signal frame having a same value as the target first original signal frame.

The target first original signal frame may be a first original signal frame with an input time stamp of 50 ms shown in FIG. 6 (for example, a first six degrees of freedom pose signal collected by the first data collector in the embodiment corresponding to FIG. 5). In this case, the VR helmet may repeatedly use the target first original signal frame in the first input queue. Namely, the VR helmet may directly copy a value of the first six degrees of freedom pose signal with the input time stamp of 50 ms in the first input queue, to obtain a supplementary signal frame corresponding to the first data collector. Therefore, the data processing apparatus may further perform step S204, to obtain an input time stamp of the supplementary signal frame.

In a second case, the data processing apparatus first extracts input time stamps of a historical first original signal frame and a target first original signal frame from the first input queue of the first data collector; secondly, the data processing apparatus may further estimate a first supplementary frame parameter according to the historical first original signal frame; next, the data processing apparatus may determine an input interval time length of the second data collector according to the second frame rate, and calculate a supplementary frame interval time length corresponding to the first supplementary frame parameter according to the input time stamp of the target first original signal frame, the input time stamp of the target second original signal frame, and the input interval time length; finally, the data processing apparatus may generate a supplementary signal frame according to the target first original signal frame, the first supplementary frame parameter, and the supplementary frame interval time length.

The target first original signal frame is a first original signal frame having a highest input time stamp in the first input queue, and the target second original signal frame is a second original signal frame having a highest input time stamp in the second input queue.

The historical first original signal frame in the first input queue may be a historical sense signal collected by the first data collector (namely, the historical first six degrees of freedom pose signal involved before the input time stamp 50 ms in the embodiment corresponding to FIG. 5). In this case, the VR helmet may estimate a head motion speed value V1 according to the historical first original signal frame (one or more historical first six degrees of freedom pose signals) shown in FIG. 6. Namely, the first supplementary frame parameter may be estimated according to the historical first original signal frame. The first supplementary frame parameter is a speed value V1 used to describe a head motion condition.

As shown in FIG. 6, an input interval time length corresponding to an output frame rate (b Hz) of the second data collector is Tb (for example, Tb=4 ms), and an input time stamp of the target second original signal frame in the second input queue is 48 ms. In this case, the VR helmet may calculate a supplementary frame interval time length corresponding to the head motion speed value V1 according to the input time stamp (50 ms) of the target first original signal frame, the input time stamp (48 ms) of the target second original signal frame, and the input interval time length (4 ms). In this case, the supplementary frame interval time length (Δt)=the input interval time length−the input time difference=4 ms−2 ms=2 ms. The input time difference is a difference between the input time stamp of the first original signal frame and the input time stamp of the second original signal frame. Next, the VR helmet may repeatedly use the target first original signal frame in the first input queue, the head motion speed value V1, and the supplementary frame interval time length, to generate the to-be-input supplementary signal frame shown in FIG. 6. In this case (assuming that a motion model within the input interval time length of the first data collector is a uniform-velocity model), the supplementary signal frame may be indicated as:

$$P=P^-+V1*\Delta t;$$

P is a generated supplementary signal frame, and $P^-$ is the target first original signal frame in the first input queue.

In a third case, the data processing apparatus first extracts an input time stamp of a target first original signal frame from the first input queue of the first data collector, and extracts an input time stamp of a target second original signal frame from the second input queue of the second data collector; secondly, the data processing apparatus may further obtain a second supplementary frame parameter (the second supplementary frame parameter may be a value input by the third data collector for describing a head motion condition; the first data collector may be a sensing device in the embodiment corresponding to FIG. 1, or may be another external communication device having a data processing capability, for example, another VR device or mobile terminal); next, the data processing apparatus may determine the input interval time length of the second data collector according to the second frame rate, and calculate the supplementary frame interval time length corresponding to the second supplementary frame parameter according to the input time stamp of the target first original signal frame, the input time stamp of the target second original signal frame, and the input interval time length; finally, the data processing apparatus may further generate a supplementary signal frame according to the target first original signal frame, the second supplementary frame parameter, and the supplementary frame interval time length.

The target first original signal frame may be a first original signal frame with an input time stamp of 50 ms shown in FIG. 6. The target second original signal frame may be a second original signal frame with an input time stamp of 48 ms shown in FIG. 6, and an input interval time length corresponding to the output frame rate (b Hz) of the second data collector is Tb (for example, Tb=4 s). Meanwhile, the VR helmet may further obtain a head motion speed value V2 (namely, a second supplementary frame parameter, where the second supplementary frame parameter may also be used to describe a head motion condition) collected by the third data collector (for example, a motion sensor). In this case, the VR helmet may calculate a supplementary frame interval time length (Δt) corresponding to the head motion speed value V2 according to the input time stamp (50 ms) of the target first original signal frame, the input time stamp (48 ms) of the target second original signal frame, and the input interval time length (4 ms). In this case, the supplementary frame interval time length (Δt)=the input interval time length−the input time difference=4 ms−2 ms=2 ms. The input time difference is a difference between the input time stamp of the first original signal frame and the input time stamp of the second original signal frame. Next, the VR helmet may repeatedly use the target first original signal frame in the first input queue, the head motion speed value V2, and the supplementary frame interval time length, to generate the to-be-input supplementary signal frame shown in FIG. 6. In this case, the supplementary signal frame may be indicated as:

$$P=P^-+V2*\Delta t;$$

P is a generated supplementary signal frame, and $P^-$ is the target first original signal frame in the first input queue.

Step S204: Determine an input time stamp of the supplementary signal frame according to the second frame rate in a case that a first frame rate of a first data collector is less than a second frame rate of a second data collector.

Specifically, the data processing apparatus may calculate, according to the second frame rate, an input time stamp of a second original signal frame to be input into the second input queue as the input time stamp of the supplementary signal frame.

For example, if the second frame rate is b Hz, in this case, an input interval time length corresponding to the second frame rate may be obtained (for example, Tb=1/b). Therefore, the input time stamp of the second original signal frame to be input into the second input queue may be calculated according to the input time stamp and Tb provided that the VR helmet obtains the input time stamp of the target second original signal frame in the second input queue. For example, when the input time stamp of the target second original signal frame shown in FIG. 6 is 48 ms, and the input interval time length is Tb=4 ms, the input time stamp of the second original signal frame to be input into the second input queue is 52 ms. In this case, the VR helmet may directly use the input time stamp as the input time stamp of the supplementary signal frame.

Optionally, the data processing apparatus may further determine the input time stamp of the supplementary signal frame according to the input time stamp of the target first original signal frame and the supplementary frame interval time length.

For example, when the VR helmet obtains that the input time stamp of the target first original signal frame in the first input queue is 50 ms, and the supplementary frame interval time length may be the supplementary frame interval time length (Δt=2 ms) described in the second case and the third case, the VR helmet may further determine the input time stamp (namely, 52 ms) of the first supplementary signal frame to be input into the first input queue.

Step S205: Input the supplementary signal frame into a first input queue of the first data collector in a case that a current time reaches the input time stamp of the supplementary signal frame, and obtain a second original signal frame that is currently input into a second input queue and that is of the second data collector.

As shown in FIG. 6, if the current time reaches the input time stamp (namely, 52 ms) of the supplementary signal frame, the supplementary signal frame generated in step S204 may be input into the first input queue, and a second original signal frame currently input into the second input queue is obtained, to further perform step S206.

Step S206: Perform signal fusion on the supplementary signal frame in the first input queue and the second original signal frame currently input into the second input queue.

Reference may be made to descriptions of steps S102 and S103 in the embodiment corresponding to FIG. 2 for a specific implementation process of steps S205 and S206, and reference may be made to descriptions of signal fusion in the embodiment corresponding to FIG. 3 for a specific process of fusing the supplementary signal frame and the second original signal frame, and details are not described herein again.

Step S207: Use the supplementary signal frame in the first input queue as the target first original signal frame of the first data collector, and generate a target supplementary signal frame according to the target first original signal frame.

Specifically, reference may be made to step S101 in the embodiment corresponding to FIG. 2 or to specific descriptions of the supplementary signal frame in the embodiment corresponding to FIG. 6 for a specific implementation process of step S207.

Figure 7:
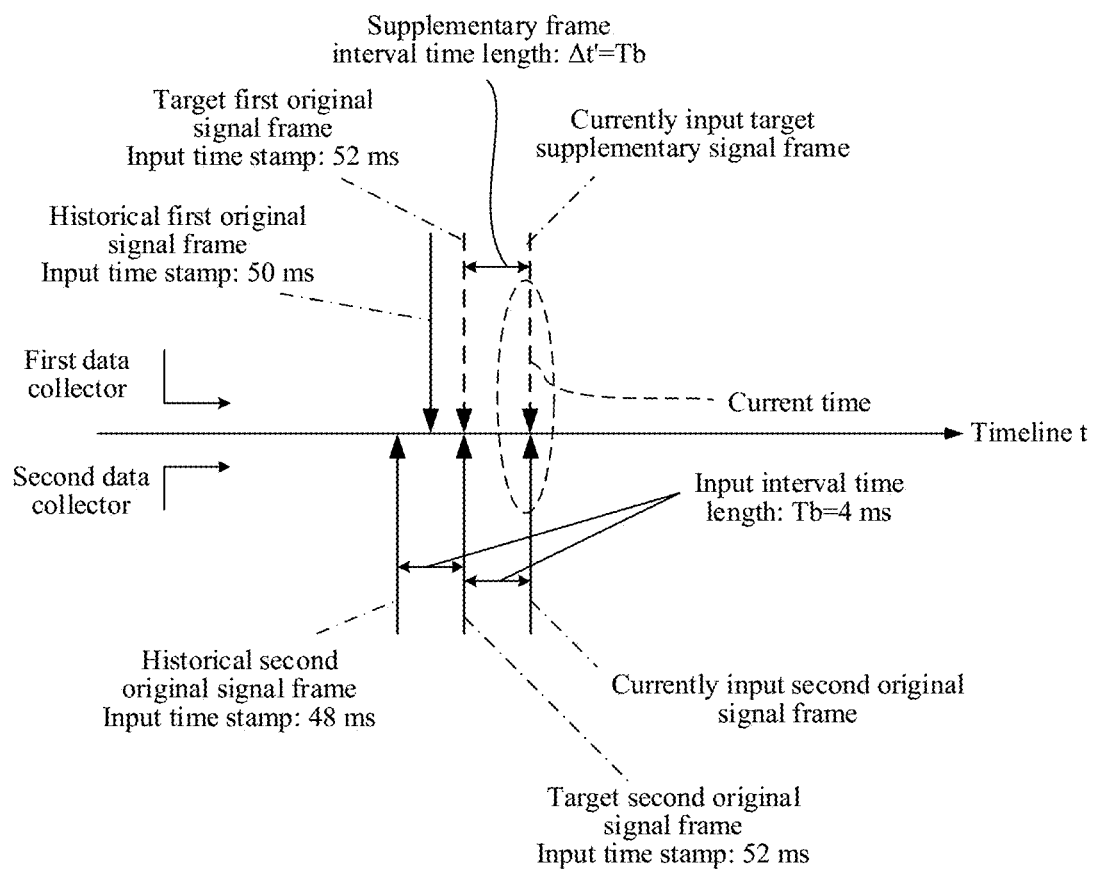
FIG. 7 is a schematic diagram of calculating an input time stamp of a target supplementary signal frame according to an embodiment of this application.

Further, FIG. 7 is a schematic diagram of calculating an input time stamp of a target supplementary signal frame according to an embodiment of this application. As shown in FIG. 7, a historical first original signal frame with an input time stamp of 50 ms and a target first original signal frame with an input time stamp of 52 ms exist in the first input queue of the first data collector. In this case, the historical first original signal frame is a first original signal frame collected by the first data collector in the embodiment corresponding to FIG. 6, and the target first original signal frame is a supplementary signal frame in the embodiment corresponding to FIG. 6. As shown in FIG. 7, a historical second original signal frame with an input time stamp of 48 ms and a target second original signal frame with an input time stamp of 52 ms exist in the second input queue of the second data collector. In this case, the historical second original signal frame is a second original signal frame collected by the second data collector in the embodiment corresponding to FIG. 6, and the target second original signal frame is a second original signal frame having a same input time stamp as the supplementary signal frame in the embodiment corresponding to FIG. 6.

Because the input interval time length Tb of the second data collector is 4 ms, and in this case, the input time stamp of the target second original signal frame is 52 ms, the data processing apparatus may determine, according to the input time stamp (52 ms) and the input interval time length (Tb), the input time stamp (namely, 56 ms) of the second original signal frame to be input into the second input queue, and use the input time stamp of the second original signal frame as the input time stamp of the target supplementary signal frame to be input into the first input queue.

Optionally, in a specific process of calculating the input time stamp of the target supplementary signal frame, the input time stamp (namely, 56 ms) of the target supplementary signal frame to be input into the first input queue may be further determined according to a sum of the input time stamp (52 ms) of the target first original signal frame and the supplementary frame interval time length ($\Delta t'$). In this case, it is to be understood that the supplementary frame interval time length is the input interval time length of the second original signal frame shown in FIG. 7 (namely, $\Delta t'=Tb$).

Step S208: Perform signal fusion on the target supplementary signal frame in the first input queue and the target second original signal frame in the second input queue in a case that the current time reaches the input time stamp of the target supplementary signal frame.

Specifically, reference may be made to descriptions of signal fusion in step S103 in the embodiment corresponding to FIG. 2 for a specific implementation process of step S208, and details are not described herein again.

In this embodiment of this application, a supplementary signal frame is generated according to a first original signal of a first data collector in a case that a first frame rate of the first data collector is less than a second frame rate of a second data collector, and an input time stamp of the supplementary signal frame is determined according to the second frame rate; the supplementary signal frame is input into a first input queue of the first data collector in a case that a current time reaches the input time stamp of the supplementary signal frame, and a second original signal frame that is currently input into a second input queue and that is of the second data collector is obtained; and signal fusion is performed on the supplementary signal frame in the first input queue and the second original signal frame currently input into the second input queue. It can be learned from the above that when the current time reaches the input time stamp of the supplementary signal frame, the supplementary signal frame generated based on the first original signal frame may be used as an input signal of the first data collector (namely, the supplementary signal frame obtained after supplementary frame processing is input into the first input queue), so that signal fusion can be performed on the supplementary signal frame and the target input signal of the second data collector (namely, the second original signal frame currently input into the second queue). In addition, based on the second frame rate of the second data collector, it can be ensured that each time the second data collector inputs a target second original signal frame, there is a signal frame (for example, a supplementary signal frame) corresponding thereto for correcting it, to ensure that the measurement precision is further improved while an estimator of a relatively high frame rate is outputted.

In an embodiment, an intelligent terminal is further provided. An internal structure of the intelligent terminal may be shown in FIG. 1a. The intelligent terminal includes a data processing apparatus. The data processing apparatus includes modules, and each module may be completely or partially implemented by software, hardware, or a combination thereof.

Figure 8:
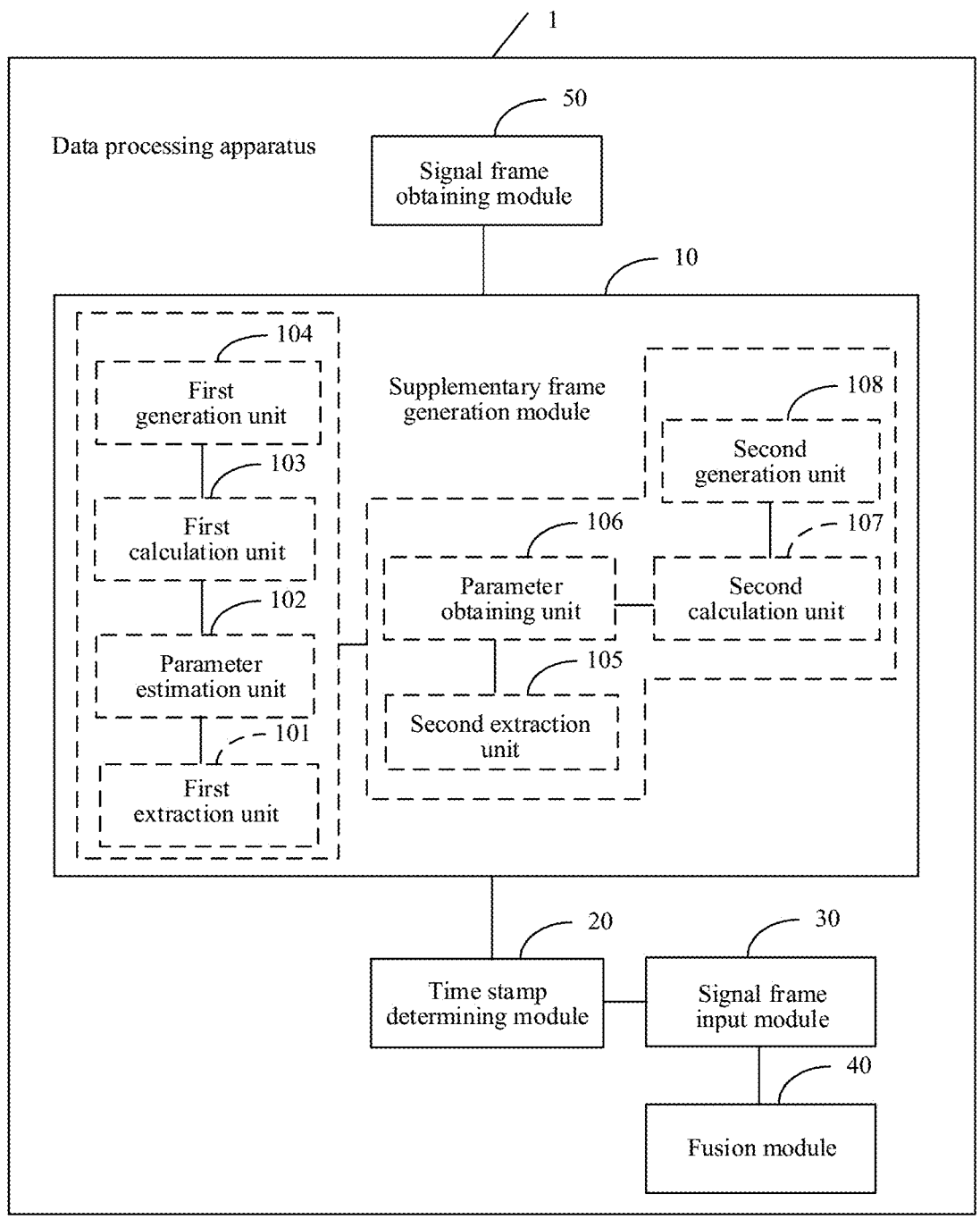
FIG. 8 is a schematic structural diagram of a data processing apparatus according to an embodiment of this application.

Further, FIG. 8 is a schematic structural diagram of a data processing apparatus according to an embodiment of this application. As shown in FIG. 8, the data processing apparatus 1 may be applied to an intelligent terminal, and the intelligent terminal may include: a smartphone, a tablet computer, a desktop computer, a smart TV, VR glasses, VR gloves, a VR helmet, a AR device (for example, AR glasses) or an artificial intelligence robot. The data processing apparatus 1 may include: a supplementary frame generation module 10, a time stamp determining module 20, a signal frame input module 30, a fusion module 40, and a signal frame obtaining module 50.

The supplementary frame generation module 10 is configured to generate a supplementary signal frame according to a first original signal frame of a first data collector in a case that a first frame rate of the first data collector is less than a second frame rate of a second data collector.

The supplementary frame generation module 10 is specifically configured to: extract a target first original signal frame corresponding to the first data collector from the first input queue of the first data collector, and generate a supplementary signal frame corresponding to the first input queue according to the target first original signal frame, a value of the supplementary signal frame being the same as a value of the target first original signal frame in a case that the target first original signal frame is the first original signal frame having a highest input time stamp in the first input queue.

Optionally, the supplementary frame generation module 10 includes: a first extraction unit 101, a parameter estimation unit 102, a first calculation unit 103, and a first generation unit 104. Further, the supplementary frame generation module 10 further includes a second extraction unit 105, a parameter obtaining unit 106, a second calculation unit 107, and a second generation unit 108.

The first extraction unit 101 is configured to: extract input time stamps of a historical first original signal frame and a target first original signal frame from the first input queue of the first data collector, and extract an input time stamp of a target second original signal frame from the second input queue of the second data collector, the target second original signal frame being a second original signal frame having a highest input time stamp in the second input queue in a case that the target first original signal frame is a first original signal frame having a highest input time stamp in the first input queue.

The parameter estimation unit 102 is configured to estimate a first supplementary frame parameter according to the historical first original signal frame.

The first calculation unit 103 is configured to: determine an input interval time length of the second data collector according to the second frame rate, and calculate a supplementary frame interval time length corresponding to the first supplementary frame parameter according to the input time stamp of the target first original signal frame, the input time stamp of the target second original signal frame, and the input interval time length.

The first generation unit 104 is configured to generate the supplementary signal frame according to the target first original signal frame, the first supplementary frame parameter, and the supplementary frame interval time length.

Reference may be made to descriptions of a specific process of generating the supplementary signal frame in the second case in the embodiment corresponding to FIG. 4 for specific implementations of the first extraction unit 101, the parameter estimation unit 102, the first calculation unit 103, and the first generation unit 104, and details are not described herein again.

It is to be understood that when the first extraction unit 101, the parameter estimation unit 102, the first calculation unit 103, and the first generation unit 104 in the supplementary frame generation module 10 are configured to generate the supplementary signal frame, the second extraction unit 105, the parameter obtaining unit 106, the second calculation unit 107, and the second generation unit 108 will not be configured to generate the supplementary signal frame. The opposite way may also be established. Namely, when the second extraction unit 105, the parameter obtaining unit 106, the second calculation unit 107, and the second generation unit 108 in the supplementary frame generation module 10 are configured to generate the supplementary signal frame, the first extraction unit 101, the parameter estimation unit 102, the first calculation unit 103, and the first generation unit 104 will not be configured to generate the supplementary signal frame.

The second extraction unit 105 is configured to: extract an input time stamp of a target first original signal frame from the first input queue of the first data collector, and extract an input time stamp of a target second original signal frame from the second input queue of the second data collector, the target second original signal frame being a second original signal frame having a highest input time stamp in the second input queue in a case that the target first original signal frame is a first original signal frame having a highest input time stamp in the first input queue.

The parameter obtaining unit 106 is configured to obtain a second supplementary frame parameter.

The second calculation unit 107 is configured to: determine an input interval time length of the second data collector according to the second frame rate, and calculate a supplementary frame interval time length corresponding to the second supplementary frame parameter according to the input time stamp of the target first original signal frame, the input time stamp of the target second original signal frame, and the input interval time length.

The second generation unit 108 is configured to generate the supplementary signal frame according to the target first original signal frame, the second supplementary frame parameter, and the supplementary frame interval time length.

Reference may be made to descriptions of a specific process of generating the supplementary signal frame in the third case in the embodiment corresponding to FIG. 4 for specific implementations of the second extraction unit 105, the parameter obtaining unit 106, the second calculation unit 107, and the second generation unit 108, and details are not described herein again.

The time stamp determining module 20 is configured to determine an input time stamp of the supplementary signal frame according to the second frame rate in a case that a first frame rate of a first data collector is less than a second frame rate of a second data collector.

The time stamp determining module 20 is specifically configured to calculate, according to the second frame rate, an input time stamp of a second original signal frame to be input into the second input queue as the input time stamp of the supplementary signal frame.

Optionally, the time stamp determining module 20 is specifically configured to determine the input time stamp of the supplementary signal frame according to the input time stamp of the target first original signal frame and the supplementary frame interval time length.

The signal frame input module 30 is configured to: input the supplementary signal frame into a first input queue of the first data collector in a case that a current time reaches the input time stamp of the supplementary signal frame, and obtain a second original signal frame that is currently input into a second input queue and that is of the second data collector.

The fusion module 40 is configured to perform signal fusion on the supplementary signal frame in the first input queue and the second original signal frame in the second input queue.

Optionally, the signal frame obtaining module 50 is configured to obtain a target first original signal frame in the first input queue and a target second original signal frame in the second input queue, the target second original signal frame being a second original signal frame having a highest input time stamp in the second input queue in a case that the target first original signal frame is a first original signal frame having a highest input time stamp in the first input queue.

Reference may be made to descriptions of step S201 to step S205 in the embodiment corresponding to FIG. 4 for specific implementations of the supplementary frame generation module 10, the time stamp determining module 20, the signal frame input module 30, the fusion module 40, and the signal frame obtaining module 50.

The fusion module 40 is further configured to perform signal fusion on the target first original signal frame in the first data collector and the target second original signal frame in the second data collector in a case that the current time reaches the input time stamp of the target first original signal frame in a case that the input time stamp of the target second original signal frame is less than the input time stamp of the target first original signal frame.

Optionally, the supplementary frame generation module 10 is further configured to: use the supplementary signal frame in the first input queue as the target first original signal frame of the first data collector, and generate a target supplementary signal frame according to the target first original signal frame.

The fusion module 40 is further configured to perform signal fusion on the target supplementary signal frame in the first input queue and the target second original signal frame in the second input queue in a case that the current time reaches the input time stamp of the target supplementary signal frame.

In this embodiment of this application, a supplementary signal frame is generated according to a first original signal of a first data collector in a case that a first frame rate of the first data collector is less than a second frame rate of a second data collector, and an input time stamp of the supplementary signal frame is determined according to the second frame rate; the supplementary signal frame is input into a first input queue of the first data collector in a case that a current time reaches the input time stamp of the supplementary signal frame, and a second original signal frame that is currently input into a second input queue and that is of the second data collector is obtained; and signal fusion is performed on the supplementary signal frame in the first input queue and the second original signal frame currently input into the second input queue. It can be learned from the above that when the current time reaches the input time stamp of the supplementary signal frame, the supplementary signal frame generated based on the first original signal frame may be used as an input signal of the first data collector (namely, the supplementary signal frame obtained after supplementary frame processing is input into the first input queue), so that signal fusion can be performed on the supplementary signal frame and the target input signal of the second data collector (namely, the second original signal frame currently input into the second queue). In addition, based on the second frame rate of the second data collector, it can be ensured that each time the second data collector inputs a target second original signal frame, there is a signal frame (for example, a supplementary signal frame) corresponding thereto for correcting it, to ensure that the measurement precision is further improved while an estimator of a relatively high frame rate is outputted.

Figure 9:
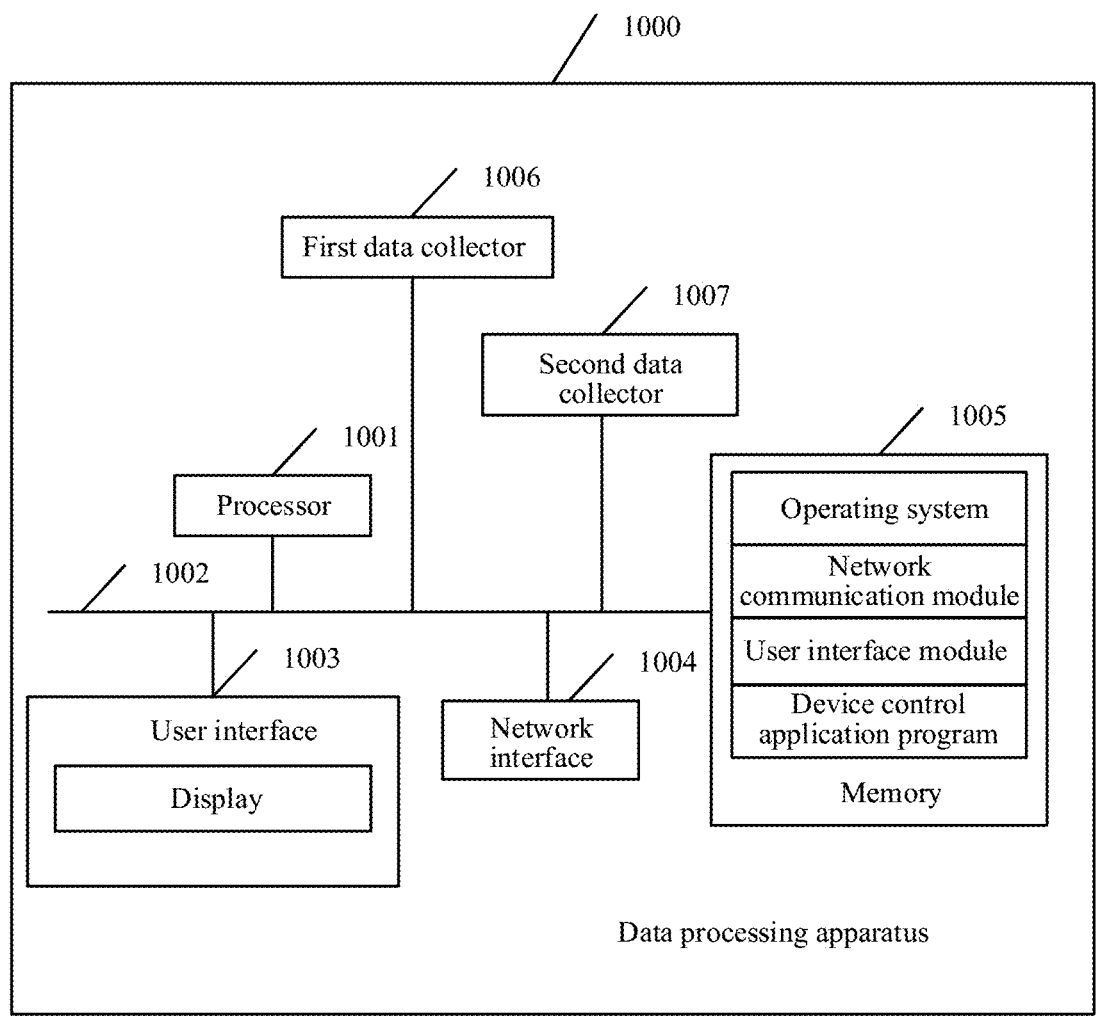
FIG. 9 is a schematic structural diagram of another data processing apparatus according to an embodiment of this application.

Further, FIG. 9 is a schematic structural diagram of another data processing apparatus according to an embodiment of this application. As shown in FIG. 9, the data processing apparatus 1000 may be applied to the intelligent terminal 2000 in the embodiment corresponding to FIG. 1. The data processing apparatus 1000 may include: a processor 1001, a network interface 1004, a memory 1005, a first data collector 1006, and a second data collector 1007. The first data collector 1006 and the second data collector 1007 may be permanently or removably attached to the intelligent terminal. In addition, the data processing apparatus 1000 may further include a user interface 1003 and at least one communication bus 1002. The communication bus 1002 is configured to implement connection and communication between the components. The user interface 1003 may include a display, and optionally, the user interface 1003 may further include a standard wired interface and a standard wireless interface. Optionally, the network interface 1004 may include a standard wired interface and a standard wireless interface (such as a WI-FI interface). The memory 1004 may be a high-speed RAM memory, or may be a non-volatile memory, for example, at least one magnetic disk memory. Optionally, the memory 1005 may further be at least one storage apparatus that is located far away from the processor 1001. As shown in FIG. 9, the memory 1005, used as a computer storage medium, may include an operating system, a network communication module, a user interface module, and a device control application program. The memory includes a non-volatile storage medium and an internal memory. The non-volatile storage medium of the computer device may store an operating system and a computer readable instruction. When executed, the computer readable instruction may cause the processor to perform a data processing method applicable to an intelligent terminal.

In the data processing apparatus 1000 shown in FIG. 9, the network interface 1004 may provide a network communication function, and the user interface 1003 is an interface mainly configured to provide input for a user. The processor 1001 may be configured to invoke a device control application program stored in the memory 1005, to implement:

generating a supplementary signal frame according to a first original signal of a first data collector in a case that a first frame rate of the first data collector in the terminal is less than a second frame rate of a second data collector, and determining an input time stamp of the supplementary signal frame according to the second frame rate;

inputting the supplementary signal frame into a first input queue of the first data collector in a case that a current time reaches the input time stamp of the supplementary signal frame, and obtaining a second original signal frame that is currently input into a second input queue and that is of the second data collector; and performing signal fusion on the supplementary signal frame in the first input queue and the second original signal frame currently input into the second input queue.

It is to be understood that the data processing apparatus 1000 described in this embodiment of this application may perform descriptions of the data processing method in the embodiment corresponding to FIG. 2 or FIG. 4, or perform descriptions of the data processing apparatus 1 in the embodiment corresponding to FIG. 8, and details are not described herein again. In addition, beneficial effects of using a same method are not described in detail again. In addition, an embodiment of this application further provides a computer storage medium, and the computer storage medium stores a computer program executed by the aforementioned data processing apparatus 1, and the computer program includes a program instruction. When executing the program instruction, the processor can perform descriptions of the data processing method in the embodiment corresponding to FIG. 2 or FIG. 4, and therefore details are not described herein again. In addition, beneficial effects of using a same method are not described in detail again. Refer to descriptions of the method embodiment of this application for technical details that are not disclosed in the embodiment of the computer storage medium involved in this application.

It should be understood that although the steps in the embodiments of this application are not necessarily performed in an order indicated by the step numbers. Unless explicitly stated in this specification, the execution of these steps is not strictly sequential, and these steps may be executed in another sequence. Moreover, at least some of the steps in each embodiment may include a plurality of sub-steps or stages, which may not necessarily be completed at the same moment, but may be performed at different moments. These sub-steps or stages are not necessarily performed in sequence, but may be performed in turn or alternately with at least some of other steps or sub-steps or stages of the other steps.

A person of ordinary skill in the art may understand that some or all procedures in the method in the foregoing embodiments may be implemented by a computer-readable instruction instructing related hardware, the program may be stored in a non-volatile computer readable storage medium, and when the program is executed, the procedures in the foregoing method embodiments may be implemented. Any reference to a memory, storage, database or other medium used in the various embodiments provided herein may include non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration and not limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus (Rambus) direct RAM (RDRAM), a direct rambus dynamic RAM (DRDRAM), and a rambus dynamic RAM (RDRAM).

The foregoing disclosure is merely exemplary embodiments of this application, and certainly is not intended to limit the protection scope of this application. Therefore, equivalent variations made in accordance with the claims of this application shall fall within the scope of this application.

What is claimed is:

1. A data processing method performed at a terminal having one or more processors and memory storing programs to be executed by the one or more processors, the method comprising:
   generating, by the terminal, a supplementary signal frame according to a first original signal of a first data collector in a case that a first frame rate of the first data collector in the terminal is less than a second frame rate of a second data collector;
   determining, by the terminal, an input time stamp of the supplementary signal frame according to the second frame rate;
   inputting, by the terminal, the supplementary signal frame into a first input queue of the first data collector in a case that a current time reaches the input time stamp of the supplementary signal frame;
   obtaining, by the terminal, a second original signal frame that is currently input into a second input queue and that is of the second data collector; and
   performing, by the terminal, signal fusion on the supplementary signal frame in the first input queue and the second original signal frame currently input into the second input queue.

2. The method according to claim 1, wherein the generating, by the terminal, a supplementary signal frame according to a first original signal of a first data collector comprises:
   extracting, by the terminal, a target first original signal frame corresponding to the first data collector from the first input queue of the first data collector; and
   generating, by the terminal, the supplementary signal frame corresponding to the first input queue according to the target first original signal frame, a value of the supplementary signal frame being the same as a value of the target first original signal frame in a case that the target first original signal frame is the first original signal frame having a highest input time stamp in the first input queue.

3. The method according to claim 1, wherein the generating, by the terminal, a supplementary signal frame according to a first original signal frame of a first data collector comprises:
   extracting, by the terminal, input time stamps of a historical first original signal frame and a target first original signal frame, respectively, from the first input queue of the first data collector; and
   extracting, by the terminal, an input time stamp of a target second original signal frame from the second input queue of the second data collector, the target second original signal frame being a second original signal frame having a highest input time stamp in the second input queue in a case that the target first original signal frame is a first original signal frame having a highest input time stamp in the first input queue;
   estimating, by the terminal, a first supplementary frame parameter according to the historical first original signal frame;
   determining, by the terminal, an input interval time length of the second data collector according to the second frame rate;
   calculating, by the terminal, a supplementary frame interval time length corresponding to the first supplementary frame parameter according to the input time stamp of the target first original signal frame, the input time stamp of the target second original signal frame, and the input interval time length; and
   generating, by the terminal, the supplementary signal frame according to the target first original signal frame, the first supplementary frame parameter, and the supplementary frame interval time length.

4. The method according to claim 3, wherein the determining, by the terminal, an input time stamp of the supplementary signal frame according to the second frame rate comprises:
   determining, by the terminal, the input time stamp of the supplementary signal frame according to the input time stamp of the target first original signal frame and the supplementary frame interval time length.

5. The method according to claim 1, wherein the determining, by the terminal, an input time stamp of the supplementary signal frame according to the second frame rate comprises:
   calculating, by the terminal according to the second frame rate, an input time stamp of a second original signal frame to be input into the second input queue as the input time stamp of the supplementary signal frame.

6. The method according to claim 1, wherein the generating, by the terminal, a supplementary signal frame according to a first original signal of a first data collector comprises:
   extracting, by the terminal, an input time stamp of a target first original signal frame from the first input queue of the first data collector; and extracting, by the terminal, an input time stamp of a target second original signal frame from the second input queue of the second data collector, the target second original signal frame being a second original signal frame having a highest input time stamp in the second input queue in a case that the target first original signal frame is a first original signal frame having a highest input time stamp in the first input queue;

obtaining, by the terminal, a second supplementary frame parameter;

determining, by the terminal, an input interval time length of the second data collector according to the second frame rate;

calculating, by the terminal, a supplementary frame interval time length corresponding to the second supplementary frame parameter according to the input time stamp of the target first original signal frame, the input time stamp of the target second original signal frame, and the input interval time length; and generating, by the terminal, the supplementary signal frame according to the target first original signal frame, the second supplementary frame parameter, and the supplementary frame interval time length.

7. The method according to claim 1, further comprising: before the generating, by the terminal, the supplementary signal frame:

obtaining, by the terminal, a target first original signal frame in the first input queue and a target second original signal frame from the second input queue, the target second original signal frame being a second original signal frame having a highest input time stamp in the second input queue in a case that the target first original signal frame is a first original signal frame having a highest input time stamp in the first input queue; and performing, by the terminal, signal fusion on the target first original signal frame in the first data collector and the target second original signal frame in the second data collector in a case that the current time reaches the input time stamp of the target first original signal frame in a case that the input time stamp of the target second original signal frame is less than the input time stamp of the target first original signal frame.

8. The method according to claim 7, further comprising:

using, by the terminal, the supplementary signal frame in the first input queue as the target first original signal frame of the first data collector, and generating a target supplementary signal frame according to the target first original signal frame; and performing, by the terminal, signal fusion on the target supplementary signal frame in the first input queue and the target second original signal frame in the second input queue in a case that the current time reaches the input time stamp of the target supplementary signal frame.

9. A terminal comprising one or more processors, memory coupled to the one or more processors and a plurality of programs stored in the memory that, when executed by the one or more processors, cause the terminal to perform a plurality of operations comprising:

generating, by the terminal, a supplementary signal frame according to a first original signal of a first data collector in a case that a first frame rate of the first data collector in the terminal is less than a second frame rate of a second data collector;

determining, by the terminal, an input time stamp of the supplementary signal frame according to the second frame rate;

inputting, by the terminal, the supplementary signal frame into a first input queue of the first data collector in a case that a current time reaches the input time stamp of the supplementary signal frame;

obtaining, by the terminal, a second original signal frame that is currently input into a second input queue and that is of the second data collector; and performing, by the terminal, signal fusion on the supplementary signal frame in the first input queue and the second original signal frame currently input into the second input queue.

10. The terminal according to claim 9, wherein the generating, by the terminal, a supplementary signal frame according to a first original signal of a first data collector comprises:

extracting, by the terminal, a target first original signal frame corresponding to the first data collector from the first input queue of the first data collector; and generating, by the terminal, the supplementary signal frame corresponding to the first input queue according to the target first original signal frame, a value of the supplementary signal frame being the same as a value of the target first original signal frame in a case that the target first original signal frame is the first original signal frame having a highest input time stamp in the first input queue.

11. The terminal according to claim 9, wherein the generating, by the terminal, a supplementary signal frame according to a first original signal frame of a first data collector comprises:

extracting, by the terminal, input time stamps of a historical first original signal frame and a target first original signal frame, respectively, from the first input queue of the first data collector; and extracting, by the terminal, an input time stamp of a target second original signal frame from the second input queue of the second data collector, the target second original signal frame being a second original signal frame having a highest input time stamp in the second input queue in a case that the target first original signal frame is a first original signal frame having a highest input time stamp in the first input queue;

estimating, by the terminal, a first supplementary frame parameter according to the historical first original signal frame;

determining, by the terminal, an input interval time length of the second data collector according to the second frame rate;

calculating, by the terminal, a supplementary frame interval time length corresponding to the first supplementary frame parameter according to the input time stamp of the target first original signal frame, the input time stamp of the target second original signal frame, and the input interval time length; and generating, by the terminal, the supplementary signal frame according to the target first original signal frame, the first supplementary frame parameter, and the supplementary frame interval time length.

12. The terminal according to claim 9, wherein the generating, by the terminal, a supplementary signal frame according to a first original signal of a first data collector comprises:

extracting, by the terminal, an input time stamp of a target first original signal frame from the first input queue of the first data collector; and extracting, by the terminal, an input time stamp of a target second original signal frame from the second input queue of the second data collector, the target second original signal frame being a second original signal frame having a highest input time stamp in the second input queue in a case that the target first original signal frame is a first original signal frame having a highest input time stamp in the first input queue;

obtaining, by the terminal, a second supplementary frame parameter;

determining, by the terminal, an input interval time length of the second data collector according to the second frame rate;

calculating, by the terminal, a supplementary frame interval time length corresponding to the second supplementary frame parameter according to the input time stamp of the target first original signal frame, the input time stamp of the target second original signal frame, and the input interval time length; and generating, by the terminal, the supplementary signal frame according to the target first original signal frame, the second supplementary frame parameter, and the supplementary frame interval time length.

13. The terminal according to claim 9, wherein the determining, by the terminal, an input time stamp of the supplementary signal frame according to the second frame rate comprises:

calculating, by the terminal according to the second frame rate, an input time stamp of a second original signal frame to be input into the second input queue as the input time stamp of the supplementary signal frame.

14. The terminal according to claim 9, wherein the operations further comprise:

before the generating, by the terminal, the supplementary signal frame:

obtaining, by the terminal, a target first original signal frame in the first input queue and a target second original signal frame from the second input queue, the target second original signal frame being a second original signal frame having a highest input time stamp in the second input queue in a case that the target first original signal frame is a first original signal frame having a highest input time stamp in the first input queue; and performing, by the terminal, signal fusion on the target first original signal frame in the first data collector and the target second original signal frame in the second data collector in a case that the current time reaches the input time stamp of the target first original signal frame in a case that the input time stamp of the target second original signal frame is less than the input time stamp of the target first original signal frame.

15. The terminal according to claim 14, wherein the operations further comprise:

using, by the terminal, the supplementary signal frame in the first input queue as the target first original signal frame of the first data collector, and generating a target supplementary signal frame according to the target first original signal frame; and performing, by the terminal, signal fusion on the target supplementary signal frame in the first input queue and the target second original signal frame in the second input queue in a case that the current time reaches the input time stamp of the target supplementary signal frame.

16. A non-transitory computer readable storage medium storing a plurality of machine readable instructions in connection with a terminal having one or more processors, wherein the plurality of machine readable instructions, when executed by the one or more processors, cause the terminal to perform a plurality of operations including:

generating, by the terminal, a supplementary signal frame according to a first original signal of a first data collector in a case that a first frame rate of the first data collector in the terminal is less than a second frame rate of a second data collector;

determining, by the terminal, an input time stamp of the supplementary signal frame according to the second frame rate;

inputting, by the terminal, the supplementary signal frame into a first input queue of the first data collector in a case that a current time reaches the input time stamp of the supplementary signal frame;

obtaining, by the terminal, a second original signal frame that is currently input into a second input queue and that is of the second data collector; and performing, by the terminal, signal fusion on the supplementary signal frame in the first input queue and the second original signal frame currently input into the second input queue.

17. The non-transitory computer readable storage medium according to claim 16, wherein the generating, by the terminal, a supplementary signal frame according to a first original signal of a first data collector comprises:

extracting, by the terminal, a target first original signal frame corresponding to the first data collector from the first input queue of the first data collector; and generating, by the terminal, the supplementary signal frame corresponding to the first input queue according to the target first original signal frame, a value of the supplementary signal frame being the same as a value of the target first original signal frame in a case that the target first original signal frame is the first original signal frame having a highest input time stamp in the first input queue.

18. The non-transitory computer readable storage medium according to claim 16, wherein the generating, by the terminal, a supplementary signal frame according to a first original signal of a first data collector comprises:

extracting, by the terminal, input time stamps of a historical first original signal frame and a target first original signal frame, respectively, from the first input queue of the first data collector; and extracting, by the terminal, an input time stamp of a target second original signal frame from the second input queue of the second data collector, the target second original signal frame being a second original signal frame having a highest input time stamp in the second input queue in a case that the target first original signal frame is a first original signal frame having a highest input time stamp in the first input queue;

estimating, by the terminal, a first supplementary frame parameter according to the historical first original signal frame;

determining, by the terminal, an input interval time length of the second data collector according to the second frame rate;

calculating, by the terminal, a supplementary frame interval time length corresponding to the first supplementary frame parameter according to the input time stamp of the target first original signal frame, the input time stamp of the target second original signal frame, and the input interval time length; and generating, by the terminal, the supplementary signal frame according to the target first original signal frame, the first supplementary frame parameter, and the supplementary frame interval time length.

19. The non-transitory computer readable storage medium according to claim 16, wherein the generating, by the terminal, a supplementary signal frame according to a first original signal of a first data collector comprises:

extracting, by the terminal, an input time stamp of a target first original signal frame from the first input queue of the first data collector; and extracting, by the terminal, an input time stamp of a target second original signal frame from the second input queue of the second data collector, the target second original signal frame being a second original signal frame having a highest input time stamp in the second input queue in a case that the target first original signal frame is a first original signal frame having a highest input time stamp in the first input queue;

obtaining, by the terminal, a second supplementary frame parameter;

determining, by the terminal, an input interval time length of the second data collector according to the second frame rate;

calculating, by the terminal, a supplementary frame interval time length corresponding to the second supplementary frame parameter according to the input time stamp of the target first original signal frame, the input time stamp of the target second original signal frame, and the input interval time length; and generating, by the terminal, the supplementary signal frame according to the target first original signal frame, the second supplementary frame parameter, and the supplementary frame interval time length.

20. The non-transitory computer readable storage medium according to claim 16, wherein the determining, by the terminal, an input time stamp of the supplementary signal frame according to the second frame rate comprises:

calculating, by the terminal according to the second frame rate, an input time stamp of a second original signal frame to be input into the second input queue as the input time stamp of the supplementary signal frame.

* * * * *